Jan. 29, 1952      N. TRBOJEVICH      2,584,097
CONSTANT VELOCITY UNIVERSAL JOINT
Filed March 11, 1946      3 Sheets-Sheet 1
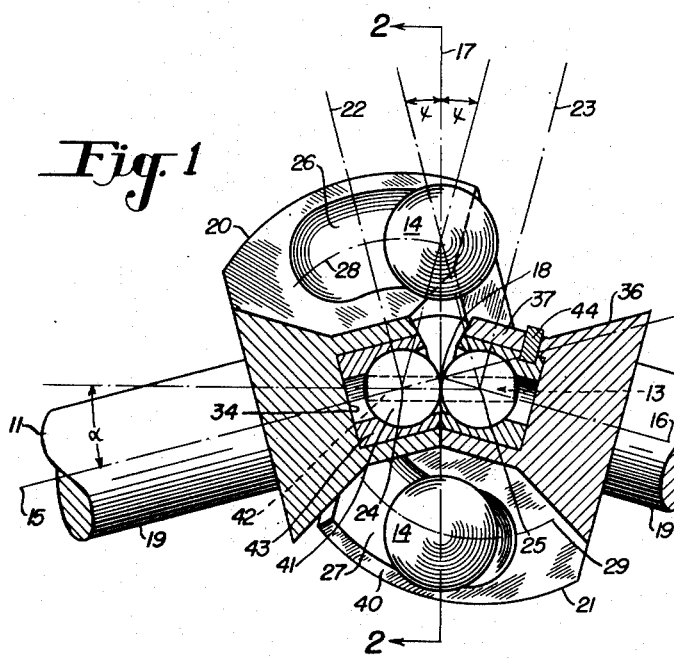
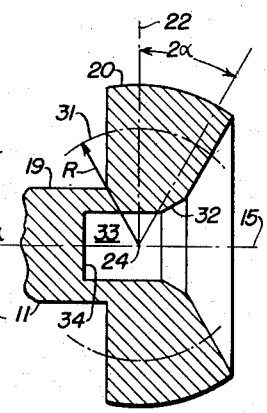
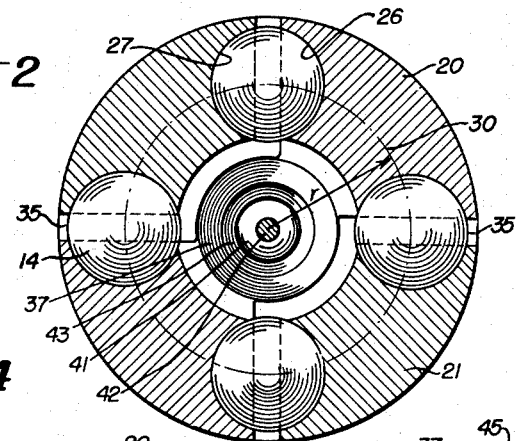
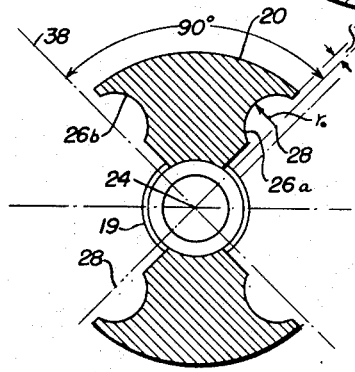
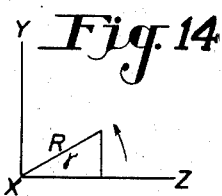
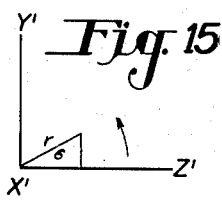
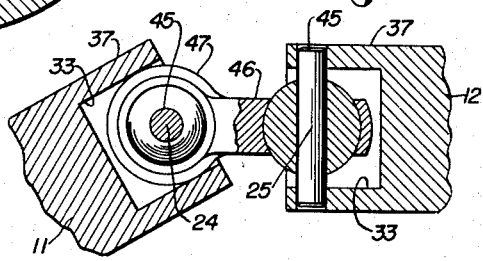
INVENTOR.
Nikola Trbojevich Jan. 29, 1952 — N. TRBOJEVICH — 2,584,097
CONSTANT VELOCITY UNIVERSAL JOINT
Filed March 11, 1946
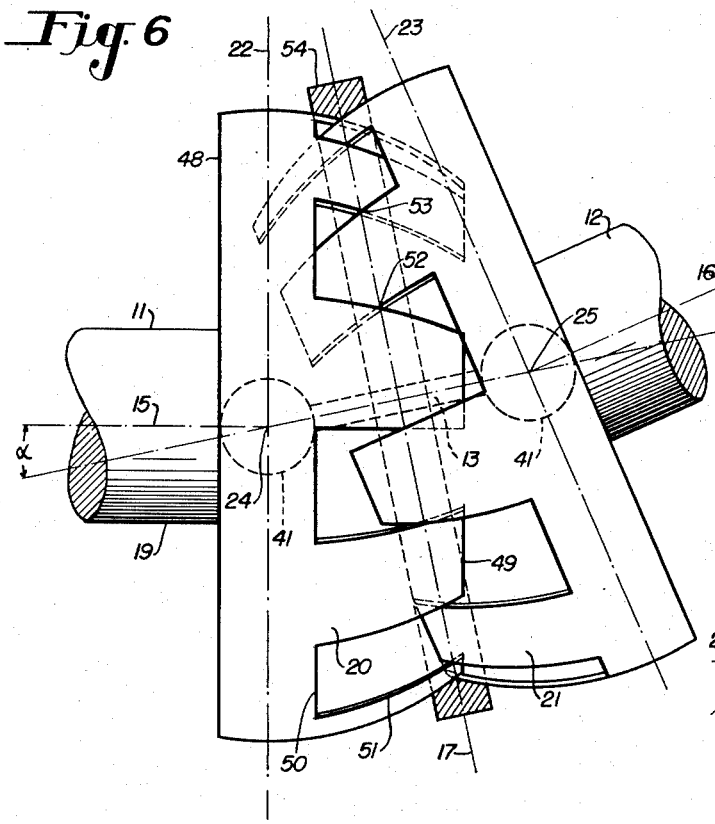
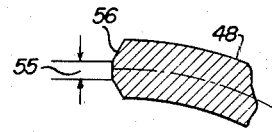
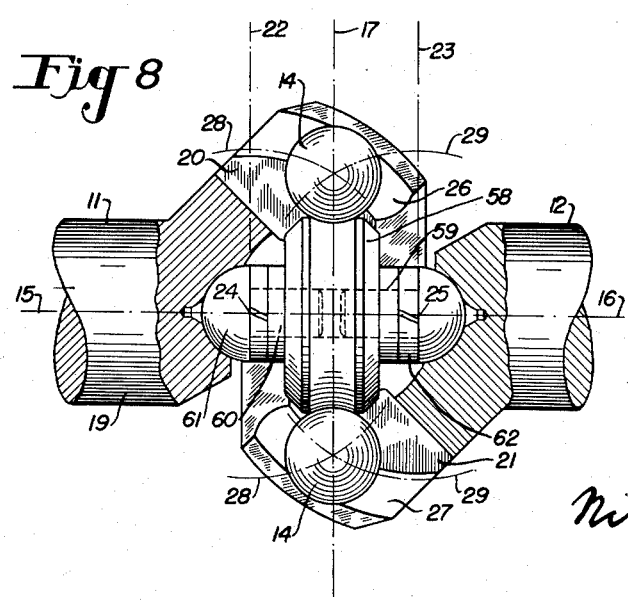
INVENTOR.
Nikola Trbojevich

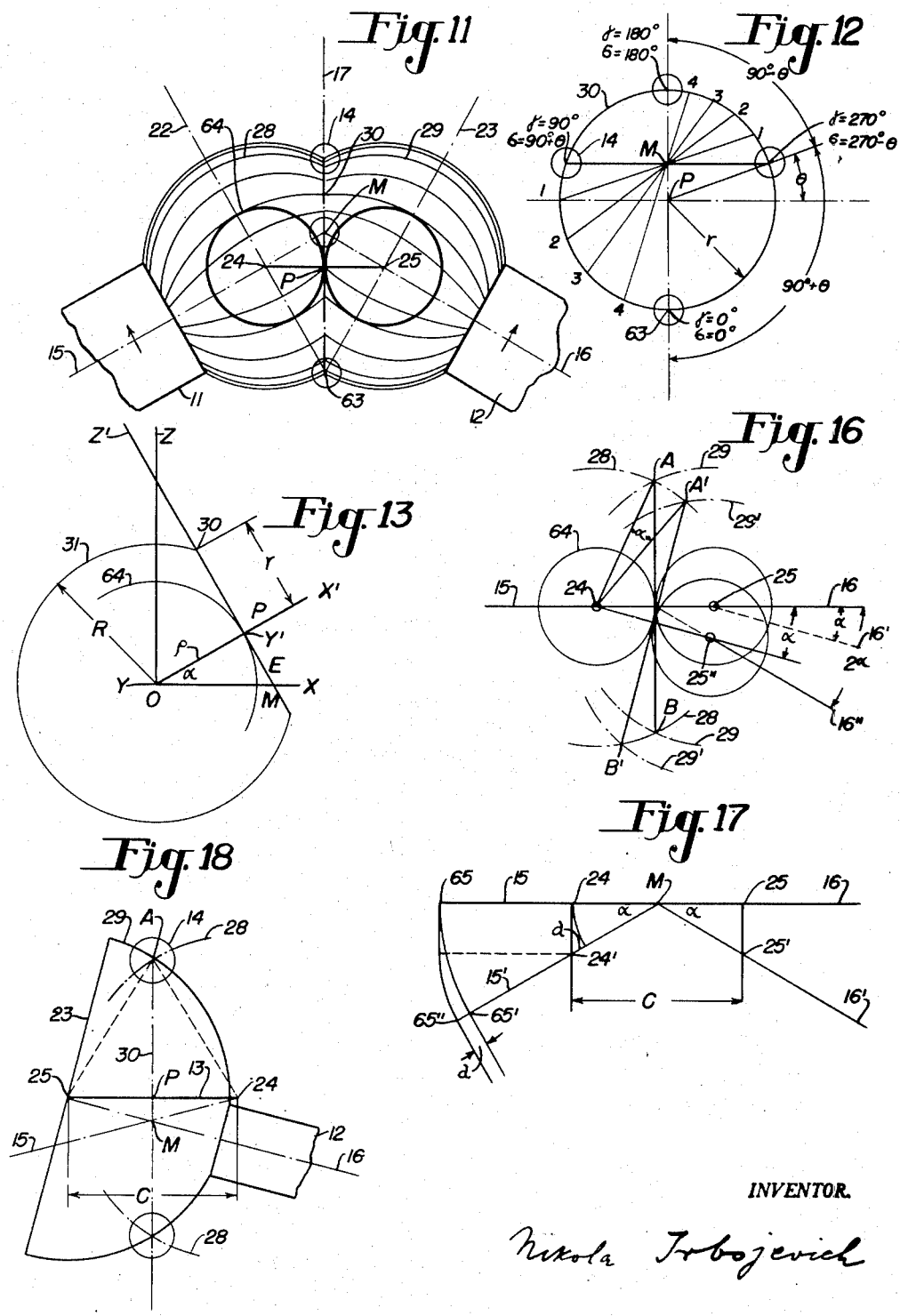

UNITED STATES PATENT OFFICE 2,584,097

CONSTANT VELOCITY UNIVERSAL JOINT

Nikola Trbojevich, Cleveland, Ohio

Application March 11, 1946, Serial No. 653,601

2 Claims. (Cl. 64—21)

The invention relates to universal joints of the constant velocity type.

In particular the joints operate according to a novel geometrical principle which I believe I was the first to discover. Heretofore it was customary to construct joints of this type (and I refer to the eccentric groove joint, C. W. Weiss, U. S. Patent 1,522,351, January 6, 1925) in such a manner that the two cooperating shafts were rotatable or pivotable with respect to each other about a common spherical center which necessitated the use of eccentric cooperating grooves in each shaft projection for the purpose of relatively "crossing" the said grooves in order that the free balls inserted between the adjacent projections might not fall out. I conceived the idea of employing meridional grooves in all shaft projections and of obtaining the constant velocity ratio and incidentally also the crossing of the grooves by disposing and rotating the shafts about two spherical centers instead of only one center as formerly. Thus according to this novel principle, the grooves are concentric with their respective sphere centers in each shaft, but the said two centers are removed from each other and interconnected by means of a double spherical link or some other equivalent means as it will be shown.

The new theory permits of two modifications which, although based upon similar geometric considerations, furnish joints which are substantially different from each other in their structural make-up. The extended type (which forms the subject matter of this application) is characterized by the fact that the spherical centers are placed upon the shaft axes before those axes cross each other at a point. The abridged type is described in two separate applications of mine of the same date and entitled "Universal Joints of the Abridged Type" and "Universal Joint," Serial Nos. 653,602 and 653,603, now Patent Nos. 2,578,763 and 2,578,764, respectively, issued December 18, 1951, respectively. In those modifications the spherical centers are placed upon what might be called the imaginary extensions of the shaft axes at points lying at the far sides of the point of intersection of the two shaft axes.

Both types of the said joints are operative also when the grooves and balls are omitted and a metallic contact is established between the adjacent shaft projections, without the employment of any additional elements. The principle involved is that of contacting certain tapering meridional projections, whereby a solid metallic ring corresponding to the momentary chordal circle of two intersecting spheres is established at all angles in a strictly angle bisecting position. Another peculiarity is that the joints are operable at variable center distances of the cooperating shafts, and a further peculiarity resides in the fact that the angles of intersections of the cooperating meridians are constant at all points and angles and the balls gyrate in a circular orbit.

In the present application three sub-modifications of the extended type will be described, one employing grooves and interposed free balls, another modification in which the grooves and the balls are omitted and a third and preferred modification in which each ball is being held in position by means of three cooperating members, see Figures 8 and 9.

The object is to construct a constant velocity joint based upon a novel principle comprising a compound rotation about two centers whereby its construction and the method of manufacture are simplified.

Another object is to construct an anti-frictional joint of a superior performance obtained by "crossing" the adjacent grooves at a constant and minimum angle in all angular positions whereby the friction in the rolling balls is reduced.

Another object is to obtain an increased torque capacity by constructing driving projections which are outwardly tapering and relatively wide at the roots, somewhat like the conventional gear teeth.

A further object is to construct a pair of mating spherical gears capable of meshing with all their teeth simultaneously and transmitting the angular velocities at a constant ratio at various angles.

Still another object is to obtain the constant velocity ratio mainly as a function of the accuracy of meridian spacing, i. e. accurately.

Another object is to construct an intermediate type of joint which although essentially a double joint yet insures the intersection of the cooperating shaft axes at a point lying in the angle bisecting plane at all times wherefore the joint may be used in front wheel drives of vehicles in lieu of a single center joint.

A most important object is to construct a modification in which each ball is supported by means of three relatively movable members instead of only two members, as formerly.

In the drawings:

Figure 1 is the plan view of the new joint of the anti-frictional type shown in cross section and with driving axes disposed at an angle of 30°.

Figure 2 is the side view in cross section taken in the plane 2—2 of Figure 1.

Figures 3 and 4 are two detail views of the shaft 11, Figure 1, drawn in a reduced scale and in cross section.

Figure 5 shows a modified design of the bispherical link 13, Figure 1, in cross section.

Figures 6 and 7 are partly diagrammatic views of a modification showing a joint of the grooveless and ball-less type.

Figures 8 and 9 are two sectional views of a joint which forms a preferred modification of the design shown in Figures 1 and 2.

Figures 10 to 18 inclusive are geometrical diagrams used in the deduction of the equations 1 to 21 inclusive.

As shown in Figures 1 and 2, the joint consists of a driving shaft 11, a drive shaft 12, a bispherical link 13, and a plurality of interposed and free balls 14. The shaft axes 15 and 16 in this design are always coplanar and intersect each other at a point 18 lying in the angle bisecting plane 17. The latter plane is perpendicular to the plane of axes (the plane of paper in Figure 1) and is also perpendicular to the link 13, which it bisects at all times.

The two drive shafts 11 and 12 are usually of an identical design wherefore they will be described together. The driving shanks 19 are coaxial with their respective axes 15 and 16 and each is integrally continued into two equispaced spherical octant-shaped projections 20 and 21, the said projections being of tapering widths as progressing outwardly and slanting towards their respective axes. The active portions of the said projections are of a sufficient length to accommodate the maximum shaft angle $2\alpha$, see also Figure 3, and they are provided each with two exactly spaced semi-circular and meridional grooves 26 and 27, one on each side and drawn from the spherical centers 24 and 25 with respect to the equator planes 22 and 23 (see also Figure 4). In this design, the ball grooves are portions of an anchor ring or torus drawn about the corresponding pitch meridians 28 and 29 with the major radius R corresponding to the pitch radius of the sphere from which the projections are formed and the minor radius $r_0$ corresponding to the radius of the interposed balls 14. It is of interest to note that any two diametrically opposite grooves as e. g. the grooves 26a in Figure 4 are the (truncated) portions of the same torus. By the virtue of this arrangement the balls and the interlocking projections always form an enclosed metallic circle 30 of a constant radius $r$ in the bisecting plane 17 (see Figure 2).

In Figures 3 and 4 the formation of either drive shaft 11 or 12 is illustrated in two detail drawings. A sphere center 24 is selected in the axis 15 and a pitch sphere 31 having a radius R is first drawn from the said center. An outwardly tapering truncated sphere corresponding to the said pitch sphere is formed and bored out at its small end in the form of a hollow cone or cones 32, and a cylindrical bore 33, the latter having a flat bottom 34. A plurality of equispaced and radial slots 35 (see Figure 9) having a width $2e$ (see Figure 4) are then milled as shown in the upper portion of Figure 1 and every other segment is removed down to the inner cone 36 and a bushing-like formation 37. The cone angle of the said cone 36 is so selected that it will not interfere with the flexing of the joint at its predetermined maximum shaft angle. In this design, due to the fact that the interlocking shaft projections rotate each about their own centers part of the time, the interference at the bottoms of the said projections is minimized. This fact coupled with the disposition of the largest or the equatorial circle 22 near the bottoms of the projections enables me to increase the cross section of the joint which is subject to a maximum stress due to bending at the roots of the projections to a considerable degree and thus increase the ability of the joint to transmit relatively considerable torques in a limited space and also to increase the maximum permissible shaft angle, in comparison with certain prior constructions.

The ball grooves 26a and 26b, see Figure 4, may be formed by means of a globular cutter of a radius $r_0$ when the said cutter is so positioned that it will describe a torus of a major radius R concentric with the sphere center of the shaft. Thus e. g., the groove 26a in the upper right corner of the said figure is generated by holding the center of curvature of such a cutter in the meridian 28 and the plane 39 relatively immovable while at the same time the shaft is bodily rotated about the transverse axis 38. Two cooperating grooves contact the balls at both sides with two line contacts which "cross" each other at a constant angle $2\psi$. Each groove is surrounded by two plane "lands" 40, see Figure 1.

The bispherical link 13 in the modification shown in Figure 1, is formed by bolting together two perforated balls 41 using a suitable bolt 42. Two spherical bushings 43, one for each ball, are next spun or extruded around each ball and turned at an exact cylindrical contour at their outside circumference to fit the corresponding central bores 33 of the shafts. The lengths of the said bushings are also predetermined and must be such that when the bushings abut the flat bottoms 34 of the said bores, the balls will be exactly centered with respect to their corresponding shafts.

The assembly of the joint is accomplished by placing the outer balls 41 and the link 13 in position while gradually telescoping one shaft into another. After the bushings 43 have arrived in the correct position (abutting the said bore bottoms 34) they are pinned in that position by means of pins 44 whereafter the joint will remain in an operating condition and cannot be taken apart without first removing the said pins.

It is possible to construct the link 13 in many different ways and one such method is shown in Figure 5. The perforated balls 41 in this instance are each mounted upon a separate stud 45 and the said stud is mounted with its both protruding ends into the cores 37 in each shaft. The said balls are rotatable in the corresponding spherical rings 47 forming the two ends of the link 46. The outer circumferences of the said rings are also spherical and of the same diameter as the diameter of the bore 33. By this means the balls when inserted into the said bores are exactly centered with respect to the shafts. The said rings 47 are twisted in their planes relatively to each other at angle of 90 degrees to facilitate the insertion of the studs 45 into the corresponding shafts which shafts are also turned through the same angle relative to each other when assembled.

In Figures 6 and 7 a ball-less modification of this joint is shown. Two similar outwardly tapering and truncated spherical shells 48 having axes 15 and 16, sphere centers 24 and 25 and equators 22 and 23 respectively, are first constructed. Into the small ends of the said shells and between the corresponding latitude circles 49 and 50 a plurality of similar equispaced and spherical trapezium shaped teeth 20 and 21 are formed in each shell, the said teeth being bounded at their tapering sides by means of converging meridians 51. It is interesting to note that this gear possesses the unique characteristic in that the contours of all its teeth and spaces are geometrically congruent and also similarly oriented, i. e. both are tapering in an outwardly direction as in a bevel gear. The points of intersection 52, 53, etc. all lie in the angle bisecting plane 17 and form a circle of the same radius at all times. Hence, it is permissible to mount a solid ring 54 having a V shaped cross contour into the corresponding crotch formed by the intersection of the said two spheres 48 without in any way interfering with the relative pivoting or rotation of the said members. In action, when the shafts 11 or 12 are rotated in the plane of the paper, the ring 54 will slide in a transverse direction across the outer circumferences of the mating spheres and will always occupy an angle bisecting position, but when the said shafts are rotated about their respective axes, the ring will rotate with them substantially in unison and there will appear only slight and unequal amounts of relative rubbing distributed at certain portions of its circumference. This last statement will be better understood when the theory of this joint will be hereinafter discussed. It is further to be noted that the said bispherical ring 54 is effective in resisting any compressive forces which may be exerted in an attempt to bring the sphere centers 24 and 24 nearer to each other. Hence, when and if such a ring is used, the bispherical link 13 in the center of the joint is relieved from carrying any longitudinally compressive thrusts being subject to only those of the tensile kind. Were an inner ring employed in this construction in conjunction with the said outer ring, the link 13 would become superfluous and could be dispensed with entirely.

The nature of contact in the adjoining teeth will be discussed in a greater detail in what follows, but it may be remarked in this connection that unless balls and ball grooves are employed, the contact must be of a point contact type. This is explainable by the fact that the mating meridians are plane curves and if several concentric meridians were to be employed in any one tooth, a single mating meridian would contact or cross all of them, whereby all but one would have their respective point of contact lying in a plane other than the bisecting plane. This would be contrary to the kinematical requirements forming a part of this problem. An exception to this rule arises when the joint operates only at a certain predetermined shaft angle, in which case the mating surfaces in two gears are produced by means of a generative principle, as is customary in other types of gearing. Thus, when joints of the solid contact type, Figure 6, are required to carry any appreciable torques, the teeth 20 and 21 are formed of a relatively heavy cross section as shown in Figure 7. The contacting tip of the tooth 55 having a comparatively narrow width is supported by the inwardly inclined side flanks 56 thus increasing the thickness of the same.

In Figures 8 and 9 the principal modification of this joint is shown. To a large extent this joint is similar to the one shown in Figures 1 and 2 except for the formation of the central portion of the same which will now be briefly described. The shafts 11 and 12 and their respective projections 20 and 21 are, again, formed from truncated tapering portions of two spheres having centers at the points 24 and 25 of the corresponding shaft axes 15 and 16. The ball grooves 26 and 27 are meridionally formed about the said centers and axes, but in this particuluar instance, the inner portions of the said grooves are cut short at the points 57, Figure 9, whereby the inner portions of the balls 14 are left exposed. The thus exposed arcs of the said balls are utilized for the purpose of supporting and holding the same in the momentary bisecting plane 17 at all angles by means of an inner race 58, Figure 8, having an axis of rotation 24—25. The central portion of the said inner race 58 is a concave surface of revolution contacting the balls 14 with a line contact as shown in the drawing while at its two sides the said race is provided with two axially extending hubs 59 and the entire race is bored through by means of an axial bore 60. Two semispherical buttons 61 having integrally formed and inwardly extending shanks snugly fit into the said bore 60 at its two ends and are accurately supported in their axial position by means of corresponding spherical bearing surfaces coaxially formed in the central cores of the cooperating shafts 11 and 12 as shown in Figure 8. The said buttons 61 may be telescoped in the said bore 60 by removing the two interposed split washers 62 by which means the joint may be disassembled. Similarly, the joint may be assembled by first inserting the balls 14 and the three centerpieces, leaving the said two washers for the last. The mechanical principle of operation of the joint shown in Figures 8 and 9 will now be explained. When it is attempted to pull the joint apart by pulling the shafts 11 and 12 away from each other, the crossed ball grooves 26 and 27 will force the balls 14 to move inwardly against the circumference of the race 58 which effectively prevents any such displacement save for a certain amount of back lash in the parts. On the other hand, all axially compressive forces and displacements are being resisted and stopped by the two spherical buttons 61. When the said cooperating grooves 26 and 27 are translated relative to each other, and they are always translating in opposite directions with a certain amount of pivoting added to it in all planes not coinciding with the plane of axes (the plane of paper in Figure 8), the balls 14 will roll and remain in the bisecting plane 17 rotating about their axes lying in the said plane and perpendicular to the axis 24—25 of the inner race 58. For this reason the said balls do not roll with respect to the said inner race but only pivot about the momentary points of contact. Any other forces, such as the transverse thrusts and the torque, are carried directly by the cooperating balls, grooves and projections, see also Figure 2.

The theory

The theory of the universal joint described in the previous paragraphs is based upon the fact that generally two similar spheres intersect in a chordal circle common to both and, if each sphere be provided with an axis of rotation and a plurality of equispaced meridians respectively coaxial with the said axes, the said chordal circle will intersect the said meridians at a variable spacing of meridians as measured along its circumference. It will now be shown that two such spheres interlocking by means of mating and tapering meridional projections cannot be assembled to cause all the corresponding meridians to simultaneously contact each other unless the said variable spacings are exactly the same and similarly oriented in both spheres in which case the chordal circle must occupy the angle bisecting position.

Thus, the mathematical procedure consists of determining the meridian spacings in a chordal circle as a function of the one half of the momentary shaft angle, and if this function is univalent (which it is) it immediately follows that the locus of the equally variable spacings in the mating spheres will, (a) occupy an angle bisecting position, (b) will cause the sphere axes to intersect at a point, (c) wil cause the mating meridians to intersect at constant angles in all planes and finally, (d) will cause the meridian intersections (or the driving balls) to gyrate in a circular orbit with relatively cyclically variable velocities.

As shown in Figure 10, the shaft axes 15 and 16 intersect at the point M at an angle $2\alpha$ in the bisecting plane 17. The sphere centers $O_1$ and $O_2$ respectively are at a fixed distance C from each other and the corresponding meridians 28 and 29 intersect at the point A. Thus, the triangle $O_1 A O_2$ is isosceles having a base C and two equal shanks corresponding to the pitch radius R of the spheres. The following few relations may now be written down at once by inspecting the said Figure 10:

$$\tan \psi = \frac{C}{2r} \quad (1)$$

$$r = R \cos \psi \quad (2)$$

$$MP = \frac{C \tan \alpha}{2} = E \quad (3)$$

$$O_1P = PO_2 = \frac{C}{2} \quad (4)$$

The above four relations express the fact that for C = constant and R = constant, which defines a certain joint, the angle at which the meridians intersect $2\psi$=constant and also the radius of the chordal circle $AP=r$ is constant. On the other hand, the distance $MP=E$ which I shall term the eccentricity of the chordal circle with respect to the point of axis intersection M, is variable being a function of the half shaft angle $\alpha$ which is also variable. What happens in this configuration is that when the axes 15 and 16 are rotated in unison with a uniform angular velocity, the isosceles triangle $O_1 A O_2$ rotates without changing its shape or size, about the axis $O_1O_2$ with, as it will be seen a variable velocity. During this rotation the mating meridians 28 and 29 slide upon each longitudinally to and from, but the momentary point of intersection A remains equidistant from the axis $O_1O_2$. The advantage of using two spherical centers $O_1$ and $O_2$ in a constant velocity joint, which is the basis of this invention is now obvious viz., a base for an isosceles triangle is created wherefrom the angle at which the cooperating grooves intersect is kept constant through a mechanical restraint and further, a constant ratio of velocity transmission is obtained.

In Figures 11 and 12 the diagram shown in Figure 10 is further developed, this time in two projections. The two cooperating spheres having respective centers at the points 24 and 25 in the axes 15 and 16 intersect in the bisecting plane 17 and in the circle 30, the latter having a center at the point P. The meridians 28 and 29 are equally spaced in both spheres across the equators 22 and 23. It follows from the general symmetry of the parts shown in Figure 11 that the corresponding meridians intersect each other all around the circumference of the circle 30 point for point, wherefore at those points the said meshing meridians possess the same longitudes. Similarly, the arcs of the meridian circles extending from the equators to the said points of intersection are correspondingly of the same length, i. e. the said points possess the same latitudes in both spheres. Therefore, the condition of meshing for two sets of equispaced meridians demands that both the longitudes and the latitudes be the same with respect to both sphere at all points of contact. Indeed, the said spheres cannot mesh in any other way, as it will be presently shown.

Let the spacing of the meridians in either equatorial circle 22 or 23, starting at the point 63 at the bottom of Figure 11 be denoted with the symbol $\gamma$ and the (variable) spacings of the points of meridian circles in the chordal circle 30 starting from the same point 63 with the symbol $s$. In Figures 13, 14 and 15 two coordinate systems XYZ and X'Y'Z' respectively are assumed the first having an origin at the center O of the sphere 31 and the second at the center P of the chordal circle 30, the said center corresponding to momentary values of $\alpha$ equal to one half of the shaft angle and a point M at which the said chordal circle momentarily intersects the shaft axis. A base sphere 64 tangent to the chordal plane MP and concentric with the pitch sphere 31 is first drawn, the radius of the said sphere being:

$$\rho = \frac{C}{2} \quad (5)$$

and is independent of either $\alpha$ or the distance OM, Figure 13. The axis of the sphere is taken to be the coordinate axis X from which the equation of any meridional plane may be written down from Figure 14 as $$y = z \tan \gamma \quad (6)$$

Next, the equation of the plane MP containing the chordal circle is written down in values pertaining to the said second coordinate system, see Figure 15, $$\left. \begin{array}{l} z' = r \cos s \\ y' = r \sin s \end{array} \right\} \quad (7)$$

In order to combine the values of $\gamma$ and $\sigma$ into a single equation it is necessary to transform the equation 6 of the first system into the second system of coordinates of the equation 7. The transformation is effected, see Figure 13, by rotating the axis X into the axis X' through an angle $\alpha$ and by translating the origin O into the new origin P through a distance $\rho$, equation 5. The well known transformation equations pertaining to this problem are now used, $$x = (x'+\rho) \cos \alpha - z' \sin \alpha$$
$$y = y' \quad (8)$$
$$z = (x'+\rho) \sin \alpha + z' \cos \alpha$$

After substituting the values from the equation 6 into the equations 8 I have:

$$y' = [(x'+\rho) \sin \alpha + z' \cos \alpha] \tan \gamma \quad (9)$$

The above defined meridional planes are intersected by means of the chordal plane M P:

$$x' = 0 \quad (10)$$

$$y' = (\rho \sin \alpha + z' \cos \alpha) \tan \gamma \quad (11)$$

By substituting from the equations 7 I have:

$$r \sin \sigma = (\rho \sin \alpha + z' \cos \alpha) \tan \gamma \quad (12)$$

By combining the equations 5 and 1 I have:

$$\rho = r \tan \psi \qquad (13)$$

Hence, the equation 12 becomes:

$$r \sin \sigma = (r \tan \psi \sin \alpha + r \cos \alpha \cos \sigma) \tan \gamma \qquad (14)$$

or simplified:

$$\tan \gamma = \frac{\sin \sigma}{\sin \alpha \tan \psi + \cos \alpha \cos \sigma} \quad \text{Q. E. D.} \quad (15)$$

An analysis of the above equation shows that the angular displacements of the meridian contacts (usually the balls) in the bisecting circle 30 are variable and follow a cycle of 180 degrees. Thus, in Figure 12, in starting the counting of the said corresponding angles $\gamma$ and $\sigma$ at the point 63 it will be seen that for the values of 0 deg. and 180 deg. respectively, the two angles are the same. However, for $\gamma=90$ deg. the conjugate angle $\sigma$ leads ahead by an angle $\theta$ the value of which is found from the equation $$\sin \theta = \tan \alpha \tan \psi \qquad (17)$$

which gives the value of $\sigma$ for $\gamma=90$ deg. as:

$$\sigma = 90° + \theta \qquad (18)$$

I analyzed the velocities of the balls in the bisecting plane and have found that the motion is very complicated in that the balls reach relative maximum and minimum values from two to four times during each revolution depending upon the relative values of $\alpha$ and $\psi$. The most important of these undulations is found for the pair of values of $\sigma$ or $\gamma$ for zero and 180 deg. respectively, the said values being:

$$\frac{w_{max}}{w_{min}} = \left(\frac{1+\sin \theta}{1-\sin \theta}\right)^2 \qquad (19)$$

in which $w_{max}$ and $w_{min}$ are the corresponding angular velocities of the balls with respect to the center P at the said two points. The numerical value of the angle $\theta$ in the layout shown in Figures 1 and 2 is equal to 4° 7' for a shaft angle of 30 deg. Incidentally, this deduction furnishes an easily understood proof or reason as to why any joint comprising a Cardan cross in which the two arms of the cross are rigidly held at right angles with respect to each other in all angular positions, cannot transmit the angular velocities at a constant ratio.

Looking now again at Figure 12, the conjugate momentary positions of the opposite balls, i. e. the balls which occupy the same meridian or torus at its two opposite sides, are shown. The chords 1—1, 2—2, 3—3, etc. indicate such successive positions of such a conjugate pair of balls. It will be noted that all these chords intersect at the point M in the bisecting plane 17 at which point also the two shaft axes 15 and 16 also intersect.

In Figure 16 a unique kinematical characteristic of this joint is illustrated. It will be shown that in this joint when one of the shafts is held firm and it is desired to flex the other shaft at an angle with respect to the same, it is necessary to rotate the said shaft about two centers and to the extent of one half of the desired angle about each center. Furthermore, the said two rotations cannot be accomplished independently of each other but must proceed in infinitesimal steps and simultaneously about both centers. This characteristic is instrumental in obtaining the constant velocity ratio of transmission at all shaft angles exactly, i. e. within the usually minute errors of workmanship. Let now the axis 15, Figure 16, be held immovable and the axis 16 be rotated about the corresponding spherical centers 25 and 24 through an angle $\alpha$ about each, i. e. for a total shaft angle of $2\alpha$. The first part of the said two rotations will carry the axis 16 into a position 16' and the second rotation about the center 24 will carry both the first center 25 into the new position 25'' and the shaft 16 into a similar position 16''. During the first phase of the rotation, the corresponding meridians 28 and 29 which apparently would intersect each other at the points A and B, cannot maintain such a relative position because the meridian 29 translates concentrically with itself relative to the stationary meridian 28 whereby its latitude increases and decreases with respect to the said points A and B while the corresponding latitudes of the mating meridian 28 in the meanwhile remain unchanged. Inasmuch as the widths of the interlocking shaft projections are tapering according to the momentary latitude angles of the same, it follows that in order to restore this discrepancy, it is necessary also to rotate the meridian 29 bodily into a new position 29' in which the new points of contact A' and B' with the stationary meridian will possess latitudes, (and also longitudes), correspondingly equal in both meridians. This is accomplished automatically by means of the said bispherical construction in this joint.

The above explanation was applied to the comparatively simple specific case in which both rotations are performed in the plane of axes and the angular displacements affect only the corresponding latitude angle, but not the longitudes. For a rotation in any other plane, both the latitudes and longitudes are involved and a rigorous kinematical explanation is much more difficult. However, owing to the fact that in this mechanism the angles at which any two cooperating meridians intersect are always the same, a substantially similar transformation takes place in any arbitrary plane. Furthermore, I verified the principle experimentally.

The compound rotation of the shafts about two centers, however, constitutes a minor disadvantage in certain limited applications of the joint in that the joint when it is flexed to an appreciable angle, slightly increases in size, i. e. the two shafts translate outwardly, away from the point of intersection M of the cooperating axes for a (fortunately) relatively small distance $d$.

In Figure 17 the exact amount of such a dilation is calculated. Assuming that the said point M is fixed, e. g. it is placed in the axis of a "king pin" in a front wheel drive steering mechanism of a vehicle, upon flexing the axes 15 and 16 about the said fulcrum M through a half shaft angle $\alpha$, the spherical centers 24 and 25 will translate into their new corresponding positions 24' and 25', the distance 24'—25' being equal to the distance 24—25. Hence, an arbitrarily selected point 65 and the axis 15 will translate into its new position 65''. The point 65' denotes a position which would be obtained if a single centered joint were employed under similar circumstances. Hence, the distance 65''—65' is the measure of the dilation $d$, for each shaft:

$$d = \frac{C}{2}(\sec \alpha - 1) \qquad (20)$$

As a specific example, the joint shown in Figure 1 has a center distance C equal to .603'' and a maximum shaft angle $2a=30$ deg. Hence, by substituting the said values in the equation 19 I shall have:

$$d=\frac{.603}{2}(1.0353-1)=.0106'' \quad \text{Q. E. D. (21)}$$

i. e. the dilation in each shaft is relatively so slight that it may be compensated for in several more or less obvious arrangements which will not be enumerated at this time.

The above theory is applicable not only to the joints of the extended type which form the subject matter of this application, but also to the abridged type which are dealt with in two separate applications as mentioned in the preamble. A diagram explanatory of the abridged principle is shown in Figure 18. The two cooperating shaft axes 15 and 16 intersect each other at the point M in the bisecting plane 17 and the respective meridian centers 24 and 25 are selected upon their respective axes after, and not before, the point M has been reached, the latter modification being the characteristic of the extended type. The balls 14 are again arranged in a circle 30 in the bisecting plane, the said circle having a center P in the link 13 connecting the centers 24 and 25, as formerly. The isosceles triangle 25—A—24 is obtained in the same manner as in the former modification cf. Figure 10, wherefore the cooperating meridians 28 and 29 all intersect at constant angles in all planes. Several constructions based upon the said abridged principle are shown in the above mentioned two copending applications of mine.

What I claim as new is:

1. A universal joint comprising two rotatable shaft members, a plurality of intermeshing projections in each shaft, two circular grooves in each projection, one on each side thereof, a spherical bearing concentric with the said grooves in each shaft, a plurality of balls in the said grooves, a relatively movable inner ring member contacting the said balls at their inner circumference and a relatively movable spacing member contacting the said bearings and holding their respective centers at a predetermined distance apart during all phases of revolution.

2. A universal joint comprising two rotatable shaft members, a plurality of intermeshing projections in each shaft, two circular grooves in each projection, one on each side thereof, a spherical bearing having a center in the shaft axis and concentric with the said grooves in each shaft, a plurality of balls in the said grooves, a relatively movable inner ring member contacting the said balls at their inner circumference and means seated in the spherical bearings for holding the said bearing centers at a predetermined distance apart during all phases of revolution.

NIKOLA TRBOJEVICH.

REFERENCES CITED

The following references are of record in the file of this patent:

UNITED STATES PATENTS

| Number | Name | Date |
|---|---|---|
| 1,677,311 | Weiss | July 17, 1928 |
| 1,769,762 | Weiss | July 1, 1930 |
| 2,462,700 | Wingquist | Feb. 22, 1949 |